(12) United States Patent
Horie et al.

(10) Patent No.: US 9,291,815 B2
(45) Date of Patent: Mar. 22, 2016

(54) OPTICAL REFLECTION ELEMENT

(71) Applicant: PANASONIC CORPORATION, Osaka (JP)

(72) Inventors: Toshiaki Horie, Osaka (JP); Soichiro Hiraoka, Hyogo (JP); Shinsuke Nakazono, Osaka (JP); Kazuki Komaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/380,308

(22) PCT Filed: Apr. 24, 2013

(86) PCT No.: PCT/JP2013/002771
§ 371 (c)(1),
(2) Date: Aug. 21, 2014

(87) PCT Pub. No.: WO2013/168386
PCT Pub. Date: Nov. 14, 2013

(65) Prior Publication Data
US 2015/0036201 A1    Feb. 5, 2015

(30) Foreign Application Priority Data
May 7, 2012   (JP) ................................ 2012-105721

(51) Int. Cl.
*G02B 26/08* (2006.01)
*G02B 26/10* (2006.01)
(52) U.S. Cl.
CPC .......... *G02B 26/0858* (2013.01); *G02B 26/105* (2013.01); *G02B 26/101* (2013.01)
(58) Field of Classification Search
CPC . G02B 26/0858; G02B 26/105; G02B 26/101

USPC ...................... 359/198.1, 221.1, 223.1, 224.1
See application file for complete search history.

(56) References Cited

U.S. PATENT DOCUMENTS 6,657,764 B1    12/2003  Smits
8,610,983 B2 *  12/2013  Yamada et al. ............ 359/199.4

(Continued)

FOREIGN PATENT DOCUMENTS

JP    2002-539496 A    11/2002
JP    2008-040240 A     2/2008

(Continued)

OTHER PUBLICATIONS

International Search Report issued in International Application No. PCT/JP2013/002771 dated Jun. 18, 2013, with English translation.

*Primary Examiner* — Frank Font
(74) *Attorney, Agent, or Firm* — McDermott Will & Emery LLP (57) ABSTRACT

An optical reflection element includes a fixed portion having a pair of sides opposite to each other, a pair of first vibration portions having one ends each connected to respective one of the sides of the fixed portion, a pair of connection portions each connected to respective one of another ends of the first vibration portions, a movable frame rotatably supported by another ends of the first vibration portions via the connection portions, a pair of second vibration portions having one ends each connected to respective one of a pair of sides of the movable frame, and a mirror rotatably connected to another ends of the second vibration portions. The second vibration portions are configured to transmit a rotational vibration about a rotation axis to the mirror. The connection portions are connected to the movable frame in a direction of the rotation axis. The connection portions are connected to a part of the movable frame at which a displacement of the movable frame due to the rotational vibration of the mirror has a minimum amount. This optical reflection element reduces unnecessary vibration, and projects clear images.

9 Claims, 11 Drawing Sheets

(56) References Cited

U.S. PATENT DOCUMENTS

| | | | |
|---|---|---|---|
| 2008/0068688 A1* | 3/2008 | Mizoguchi | 359/199 |
| 2009/0109512 A1* | 4/2009 | Park | 359/199.2 |
| 2010/0245966 A1* | 9/2010 | Yasuda | 359/224.1 |
| 2010/0296147 A1 | 11/2010 | Terada et al. | |
| 2012/0062970 A1* | 3/2012 | Yamada et al. | 359/199.4 |
| 2012/0320441 A1 | 12/2012 | Kann et al. | |
| 2014/0355089 A1* | 12/2014 | Murayama et al. | 359/199.4 |
| 2014/0368896 A1* | 12/2014 | Nakazono et al. | 359/198.1 |
| 2015/0049155 A1* | 2/2015 | Morikawa et al. | 347/260 |

FOREIGN PATENT DOCUMENTS

| | | |
|---|---|---|
| JP | 2011-017916 A | 1/2011 |
| JP | 2011-141333 A | 7/2011 |
| WO | 00/55666 A1 | 9/2000 |
| WO | 2009/096182 A1 | 8/2009 |

\* cited by examiner

PRIOR ART

OPTICAL REFLECTION ELEMENT

RELATED APPLICATIONS

This application is the U.S. National Phase under 35 U.S.C. §371 of International Application No. PCT/JP2013/002771, filed on Apr. 24, 2013, which in turn claims the benefit of Japanese Application No. 2012-105721, filed on May 7, 2012, the disclosures of which Applications are incorporated by reference herein.

TECHNICAL FIELD

The present invention relates to an optical reflection element used for a device, such as an optical reflecting device using laser light.

BACKGROUND ART

In recent years, optical reflection elements have been developed that project images on a screen by scanning laser with s micro electromechanical systems (MEMS) technology. The laser is scanned two-dimensionally with an optical reflection element as to project the images with light. The optical reflection element may be driven with a piezoelectric actuator.

Figure 12:
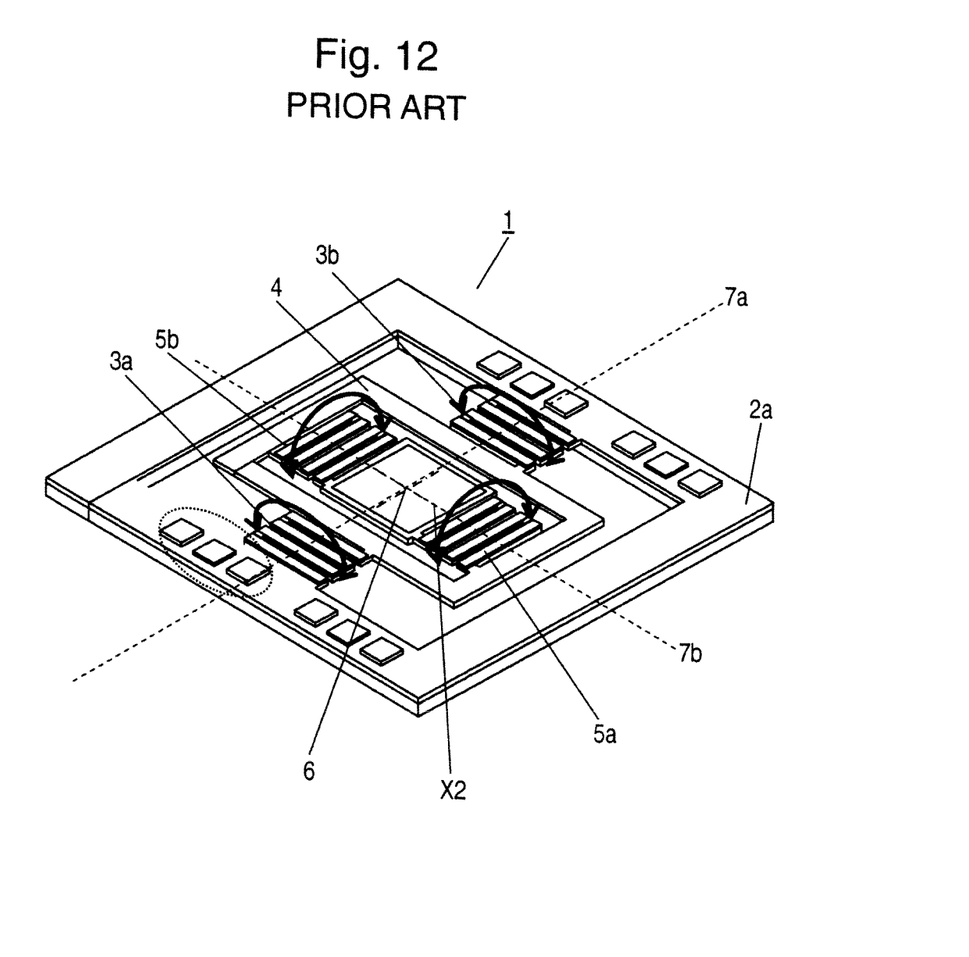
FIG. 12 is a perspective view of a conventional optical reflection element.

FIG. 12 is a perspective view of conventional optical reflection element 1 disclosed in PTL 1. Optical reflection element 1 includes fixed portion 2a, a pair of first vibration portions 3a and 3b connected to inside portions of fixed portion 2a opposite to each other, movable frame 4 connected to another ends of the pair of first vibration portions 3a and 3b, a pair of second vibration portions 5a and 5b connected to inside portions of movable frame 4 opposite to each other, and mirror 6 connected to another ends of the pair of second vibration portions 5a and 5b. First axis 7a which is a rotation axis of first vibration portions 3a and 3b is substantially perpendicular to second axis 7b which is a rotation axis of second vibration portions 5a and 5b. The pair of first vibration portions 3a and 3b are connected to sides of movable frame 4 parallel with the rotation axis of second vibration portions 5a and 5b.

Figure 13:
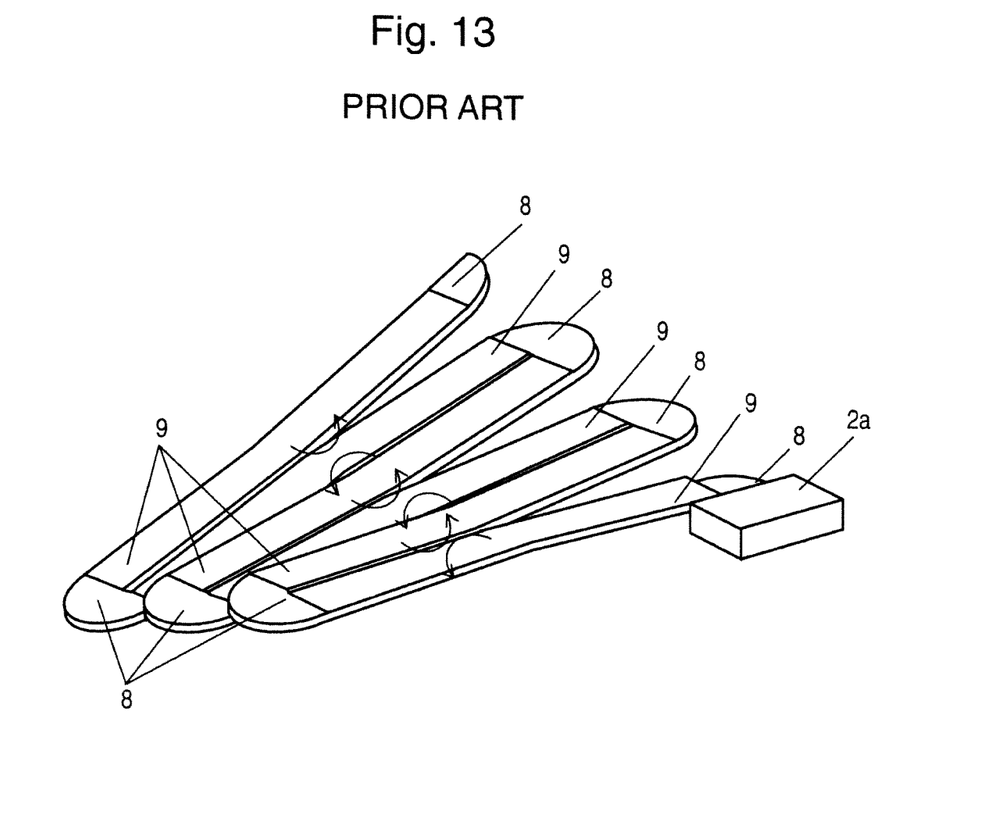
FIG. 13 is an enlarged view of the conventional optical reflection element.

FIG. 13 is an enlarged perspective view of optical reflection element 1 for illustrating first vibration portions 3a and 3b. First vibration portions 3a and 3b are beams connected to and supported by fixed portion 2a. First vibration portions 3a and 3b have a meandering shape which is folded at plural positions and which includes plural bends 8 and plural joints 9 connecting plural bends 8. Similarly to first vibration portions 3a and 3b, second vibration portions 5a and 5b are beams connected to and supported by movable frame 4. Second vibration portions 5a and 5b have a meandering shape which is folded at plural positions and which includes bends 8 and joints 9.

Piezoelectric actuators are formed on bends 8 and joints 9. Each of the piezoelectric actuator includes an insulating layer, a lower electrode provided on the insulating layer, a piezoelectric layer provided on the piezoelectric layer, and an upper electrode provided on the piezoelectric layer. The piezoelectric actuators are driven to have phases opposite to each other, such that joints 9 are displaced and bent in directions of the arrows. Consequently, the displacements are accumulated by the number of joints 9 and produce a large displacement at one end of the meandering shape. The optical reflection element scans laser utilizing the displacement.

A conventional optical reflection element similar to optical reflection element 1 is disclosed in PTL 2.

CITATION LIST

Patent Literature

PTL 1: Japanese Patent Laid-Open Publication No.2008-040240

PTL 2: Japanese Patent Laid-Open Publication No.2011-141333

SUMMARY

An optical reflection element includes a fixed portion having a pair of sides opposite to each other, a pair of first vibration portions having one ends each connected to respective one of the pair of sides of the fixed portion, a pair of connection portions each connected to respective one of another ends of the pair of first vibration portions, a movable frame rotatably supported by another ends of the pair of first vibration portions via the pair of connection portions, a pair of second vibration portions having one ends each connected to respective one of a pair of sides of the movable frame, and a mirror rotatably connected to another ends of the pair of second vibration portions. The pair of second vibration portions are configured to transmit a rotational vibration about a rotation axis to the mirror. The pair of connection portions are connected to the movable frame in a direction of the rotation axis. The pair of connection portions are connected to a part of the movable frame at which a displacement of the movable frame due to the rotational vibration of the mirror has a minimum amount.

This optical reflection element reduces unnecessary vibration, and projects clear images.

DETAIL DESCRIPTION OF PREFERRED EMBODIMENT

Figure 1:
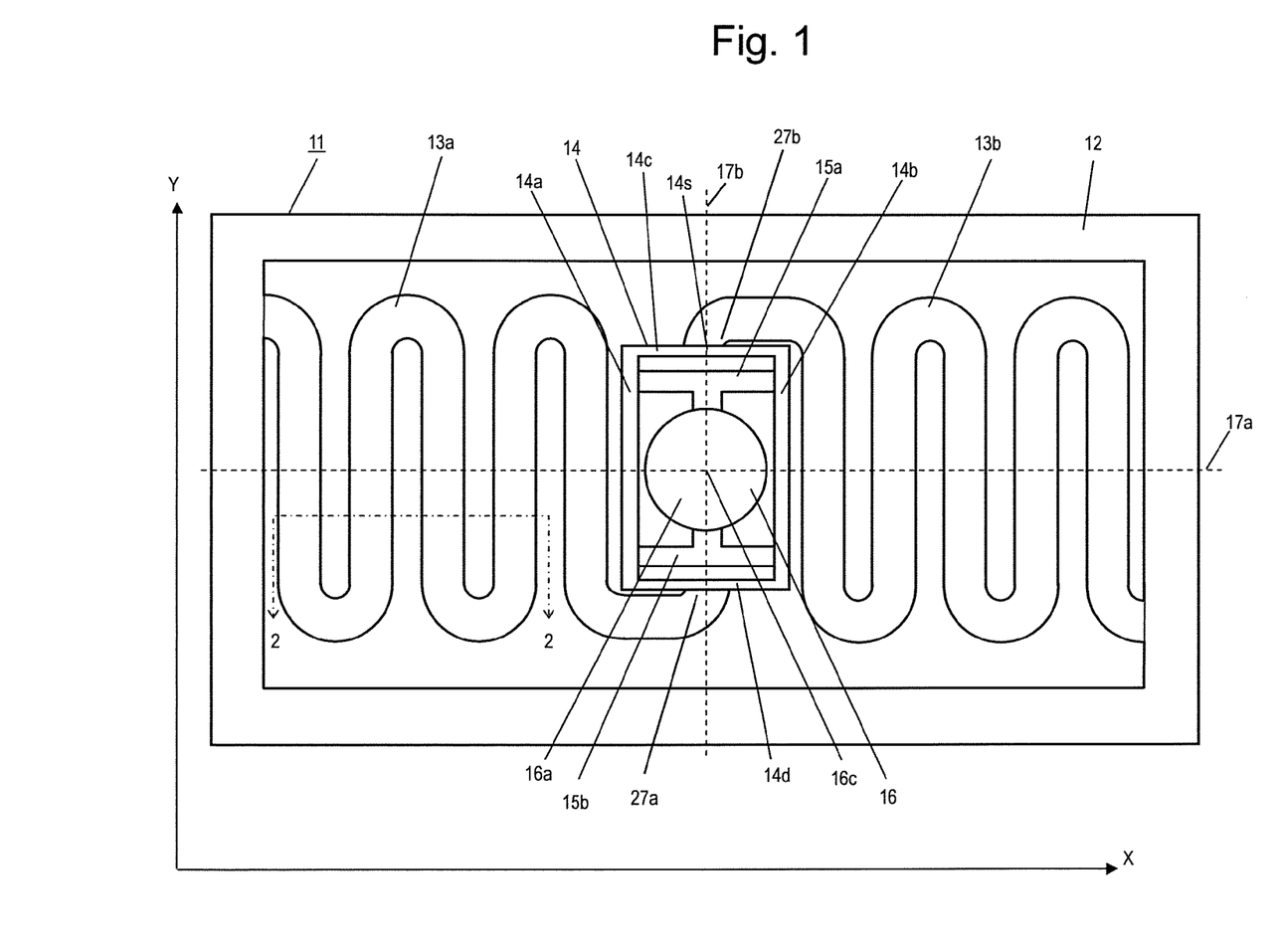
FIG. 1 is a plan view of an optical reflection element according to an exemplary embodiment.

FIG. 1 is a top view of optical reflection element 11 according to an exemplary embodiment. Optical reflection element 11 includes fixed portion 12, a pair of vibration portions 13a and 13b, a pair of connection portions 27a and 27b, movable frame 14, a pair of vibration portions 15a and 15b, and mirror 16. One ends of the pair of vibration portions 13a and 13b are connected to an inside of fixed portion 12 and supported by fixed portion 12. Another ends of the pair of vibration portions 13a and 13b are connected to movable frame 14 to support movable frame 14. Vibration portions 13a and 13b are positioned opposite to each other with respect to movable frame 14. In detail, the pair of connection portions 27a and 27b are connected to another ends of vibration portions 13a and 13b, respectively. Movable frame 14 is rotatably supported by another ends of the pair of vibration portions 13a and 13b via the pair of connection portions 27a and 27b. The pair of vibration portions 15a and 15b are connected to an inside of movable frame 14 and supported by movable frame 14. Another ends of vibration portions 15a and 15b are connected to mirror 16 to support mirror 16. Vibration portions 15a and 15b are positioned opposite to each other with respect to mirror 16. Vibration portions 13a and 13b support movable frame 14 so as to rotate movable frame 14 about rotation axis 17a. Vibration portions 15a and 15b support mirror 16 so as to rotate mirror 16 about rotation axis 17b substantially perpendicular to rotation axis 17a. Movable frame 14 has substantially a rectangular shape having sides 14a and 14b opposite to each other and sides 14c and 14d opposite to each other. Sides 14a and 14b extend in parallel with rotation axis 17b while sides 14c and 14d extend in parallel with rotation axis 17a. Connection portions 27a and 27b are connected to sides 14d and 14c of movable frame 14, respectively.

Figure 2:
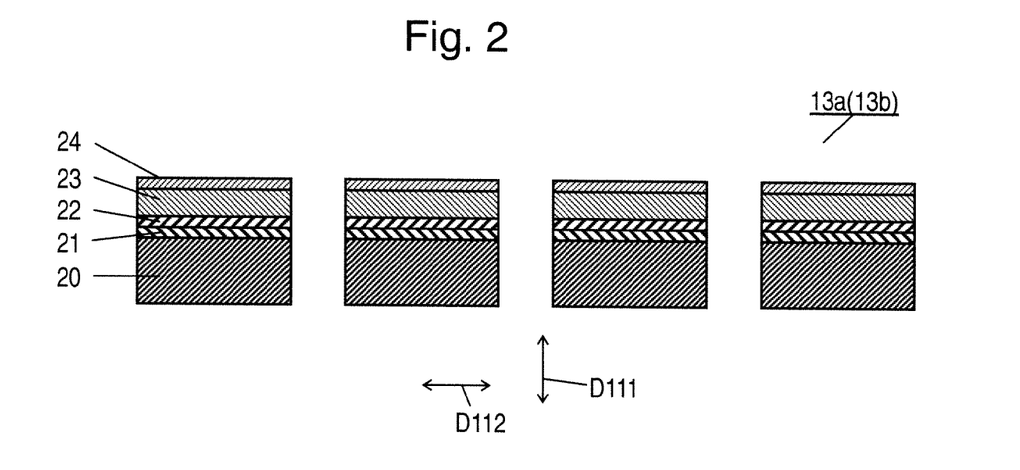
FIG. 2 is a sectional view of the optical reflection element at line 2-2 shown in FIG. 1.

FIG. 2 is a sectional view of optical reflection element 11 at line 2-2 shown in FIG. 1. Each of Vibration portions 13a and 13b includes substrate 20 made of silicon and insulating layer 21 provided on substrate 20. Fixed portion 12, vibration portions 13a and 13b, movable frame 14, vibration portions 15a and 15b, and mirror 16 are integrally made of substrate 20. Lower electrode 22 is provided on insulating layer 21. Piezoelectric layer 23 is provided on lower electrode 22. Upper electrode 24 is provided on piezoelectric layer 23. Substrate 20, insulating layer 21, lower electrode 22, piezoelectric layer 23, and upper electrode 24 are stacked in thickness direction D111 of vibration portions 13a and 13b. In optical reflection element 11 according to the embodiment, thickness direction D111 is perpendicular to rotational axes 17a and 17b and is perpendicular to reflecting surface 16a of mirror 16 that reflects light.

Lower electrode 22 is made of conductive material, such as platinum; piezoelectric layer 23 is made of piezoelectric material, such as lead zirconate titanate ($Pb(Zr_{1-x}Ti_x)O_3$). These materials are formed into thin film by, e.g. vapor deposition, sol-gel process, chemical vapor deposition, or sputtering to form lower electrode 22 and piezoelectric layer 23.

Figure 3:
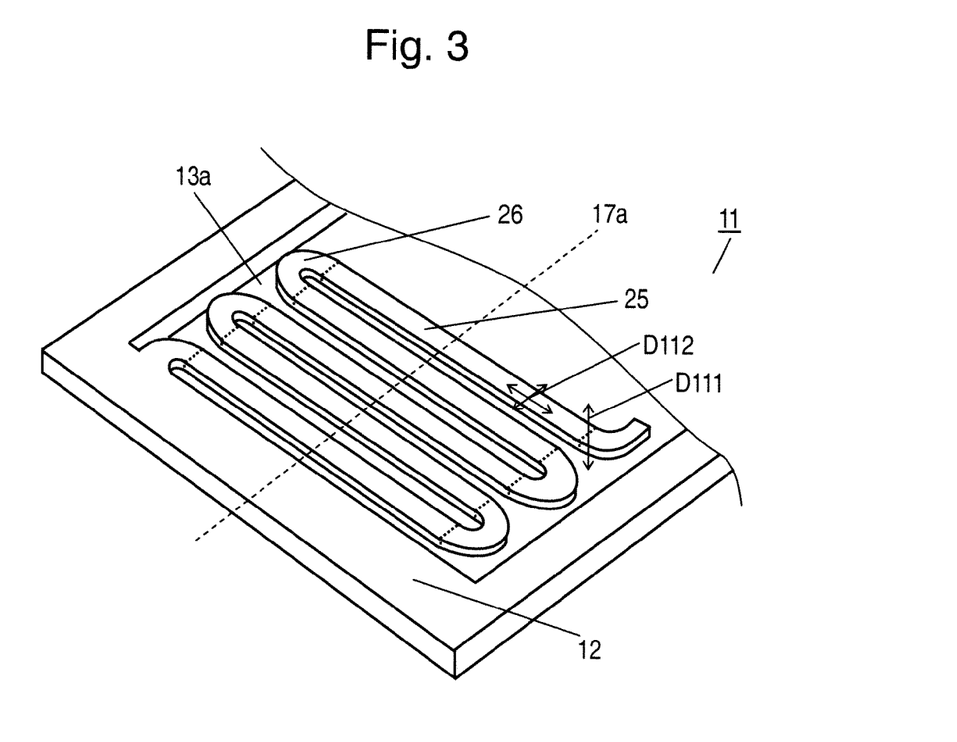
FIG. 3 is an enlarged perspective view of the optical reflection element according to the embodiment.

FIG. 3 is an enlarged perspective view of optical reflection element 11 for illustrating vibration portion 13a. Vibration portion 13a has a meandering shape including plural joints 25 and plural bends 26 connecting joints 25. Plural joints 25 and plural bends 26 are alternately arranged. Bend 26 connects joints 25 adjacent to each other. Upon a predetermined voltage being applied between lower electrode 22 and upper electrode 24 of vibration portion 13a, predetermined electric field is applied to piezoelectric layer 23 and exhibits a reverse piezoelectric effect that causes piezoelectric layer 23 to expand and contract in surface direction D112 perpendicular to thickness direction D111 of piezoelectric layer 23. The expansion and contraction in surface direction D112 generated in piezoelectric layer 23 acts as a moment in thickness direction D111 of vibration portion 13a, and causes vibration portion 13a to vibrate to warp in thickness direction D111. Upon voltages having opposite phases being applied to joints 25 of vibration portion 13a adjacent to each other, warpages of joints 25 are accumulated to produce a large rotational displacement about rotation axis 17a.

Figure 4:
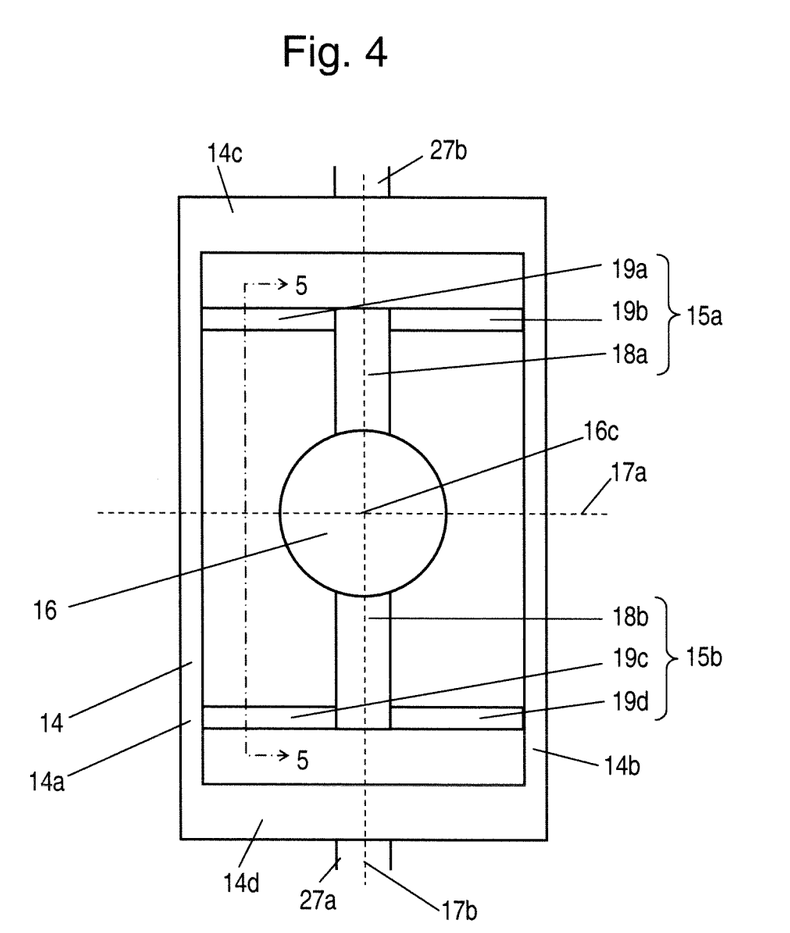
FIG. 4 is an enlarged plan view of the optical reflection element according to the embodiment.

FIG. 4 is an enlarged plan view of optical reflection element 11 for illustrating movable frame 14, vibration portions 15a and 15b, and mirror 16. Vibration portions 15a and 15b have torsion bar shapes inside movable frame 14. Vibration portion 15a includes joint part 18a and drive parts 19a and 19b. Joint part 18a is connected to mirror 16 while drive parts 19a and 19b connect joint part 18a to movable frame 14. Vibration portion 15b includes joint part 18b and drive parts 19c. Joint part 18b is connected to mirror 16 while drive parts 19c and 19d connect joint part 18b to movable frame 14. Joint parts 18a and 18b are positioned opposite to each other with respect to mirror 16. Drive parts 19a and 19b support joint part 18a so as to sandwich joint part 18a from sides 14a and 14b of movable frame 14, and connect joint part 18a to sides 14a and 14b of movable frame 14, respectively. One ends of joint parts 18a and 18b are connected to one ends of drive parts 19a to 19d while another ends of joint parts 18a and 18b are connected to mirror 16.

Figure 5:
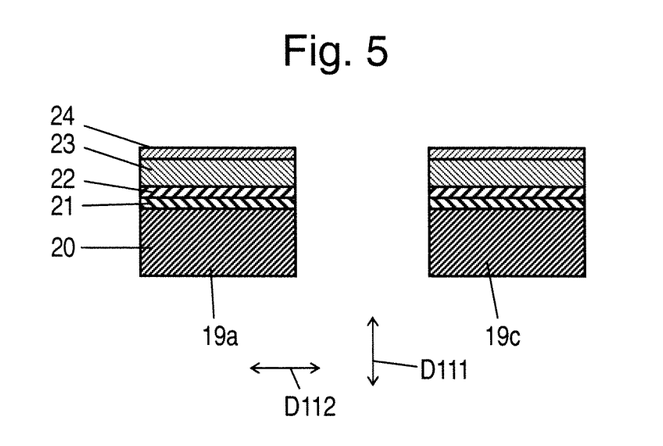
FIG. 5 is a sectional view of the optical reflection element at line 5-5 shown in FIG. 4.

FIG. 5 is a sectional view of optical reflection element 11 at line 5-5 shown in FIG. 4. Each of drive parts 19a, 19b, 19c, and 19d includes substrate 20 made of silicon, insulating layer 21 provided on substrate 20, lower electrode 22 provided on insulating layer 21, piezoelectric layer 23 provided on lower electrode 22, and upper electrode 24 provided on piezoelectric layer 23. Substrate 20, insulating layer 21, lower electrode 22, piezoelectric layer 23, and upper electrode 24 are stacked in thickness direction D111. Upon a predetermined voltage being applied between lower electrode 22 and upper electrode 24, drive parts 19a, 19b, 19c, and 19d vibrate to warp in thickness direction D111. A voltage applied to drive part 19a has a phase opposite to that of a voltage applied to drive part 19b faces drive part 19a each other across joint part 19a. These voltages cause drive parts 19a and 19b to cause joint part 18a to twist about rotation axis 17b. Similarly to joint part 18a, voltage having opposite phases being applied to drive parts 19c and 19d causes joint part 18b to twist about rotation axis 17b. Further, the voltages having the same phase are applied to drive parts 19a and 19c, and the voltages having the same phase are applied to drive parts 19b and 19d. These voltages cause the pair of joint parts 18a and 18b to twist about rotation axis 17b with the same phase, i.e., in the same direction, and cause mirror 16 to vibrate rotationally around rotation axis 17b.

In conventional optical reflection element 1 shown in FIGS. 12 and 13, vibration of second vibration portions 5a and 5b that rotate about second axis 7b transmits to first vibration portions 3a and 3b that rotate about first axis 7a via movable frame 4. This causes unnecessary vibration in first vibration portions 3a and 3b that rotate about first axis 7a, and may produce an unclear images projected with optical reflection element 1.

Optical reflection element 11 according to the embodiment shown in FIG. 1 can reduce such an unnecessary vibration in vibration portions 13a and 13b.

Figure 6:
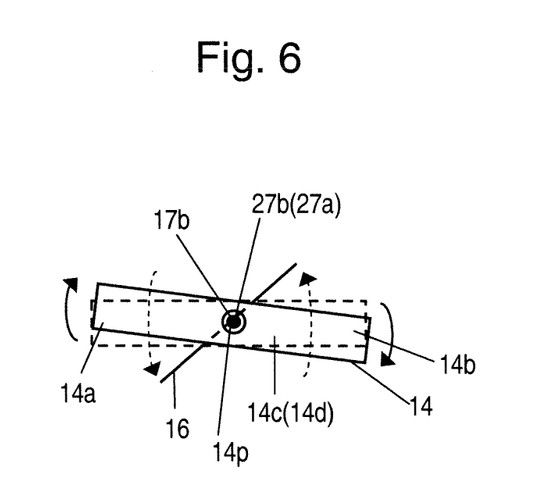
FIG. 6 is a side view of a movable frame of the optical reflection element according to the embodiment.

FIG. 6 is a side view of movable frame 14 of optical reflection element 11. When mirror 16 vibrates rotationally about rotation axis 17b, a reaction of the rotation causes movable frame 14 to vibrate rotationally about rotation axis 17b in a direction opposite to the direction of the rotation of mirror 16. In other words, the rotational vibration of mirror 16 displaces parts of sides 14c and 14d of movable frame 14 which are parallel to rotation axis 17b and which are located away from rotation axis 17b such that the parts of sides 17a and 17b rotate about rotation axis 17b. In the case that connection portions 27a and 27b connected to vibration portions 13a and 13b are connected to sides 14a and 14b of movable frame 14 parallel to rotation axis 17b, respectively, a vertical vibration due to the rotational vibration of movable frame 14 transmits to vibration portions 13a and 13b. The vibration causes unnecessary vibration in vibration portions 13a and 13b, and prevents vibration portions 15a and 15b from driving mirror 16.

When movable frame 14 is displaced due to the rotation of vibration portions 15a and 15b, the amount of the displacement of a portion of movable frame 14 about rotation axis 17b changes depending on the position of the portion of movable frame 14. As shown in FIG. 6, in optical reflection element 11 according to the embodiment, connection portions 27a and 27b, i.e., vibration portions 13a and 13b, are connected to part 14p where the displacement of movable frame 14 has a minimum amount. This arrangement reduces the vibration transmitting from vibration portions 15a and 15b to vibration portions 13a and 13b.

In the case that vibration portions 15a and 15b have the torsion bar shape as shown in FIG. 1, part 14p where the displacement of movable frame 14 has a minimum amount agrees with rotation axis 17b of vibration portions 15a and 15b. Hence, the arrangement in which vibration portions 13a and 13b, i.e., connection portions 27a and 27b, are connected to movable frame 14 on rotation axis 17b reduces the vibration transmitting to vibration portions 13a and 13b. Movable frame 14 can be supported in balance particularly in the case that movable frame 14 is supported at midpoint 14s of sides 14d and 14c of movable frame 14 in a direction of rotation axis 17a. This configuration reduces the unnecessary vibration of vibration portions 13a and 13b more than an optical reflection element including connection portions 27a and 27b located away from rotation axis 17b of vibration portions 15a and 15b.

Vibration portions 13a and 13b are preferably symmetrical to each other with respect to center point 16c of mirror 16 while connection portions 27a and 27b are preferably symmetrical to each other with respect to center point 16c of mirror 16. Rotational axes 17a and 17b cross at center point 16c of mirror 16. In the case that vibration portions 13a and 13b are not symmetrical to each other with respect to the point but are symmetrical to each other with respect to a line and connection portions 27a and 27b are not symmetrical to each other with respect to the point but are symmetrical to each other with respect to a line, both connection portions 27a and 27b are connected to either one of sides 14c and 14d of movable frame 14. This structure increases a moment of inertia of vibration portions 13a and 13b, hence providing deterioration of the frequency characteristics of vibration portions 13a and 13b. In the case that vibration portions 13a and 13b are not symmetrical to each other or connection portions 27a and 27b are not symmetrical to each other, the balance between the moments of weights opposite to each other with respect to rotation axis 17b. Consequently, a rotation axis about which movable frame 14 rotates does not agree with rotation axis 17b, and produces unnecessary vibration.

Figure 7:
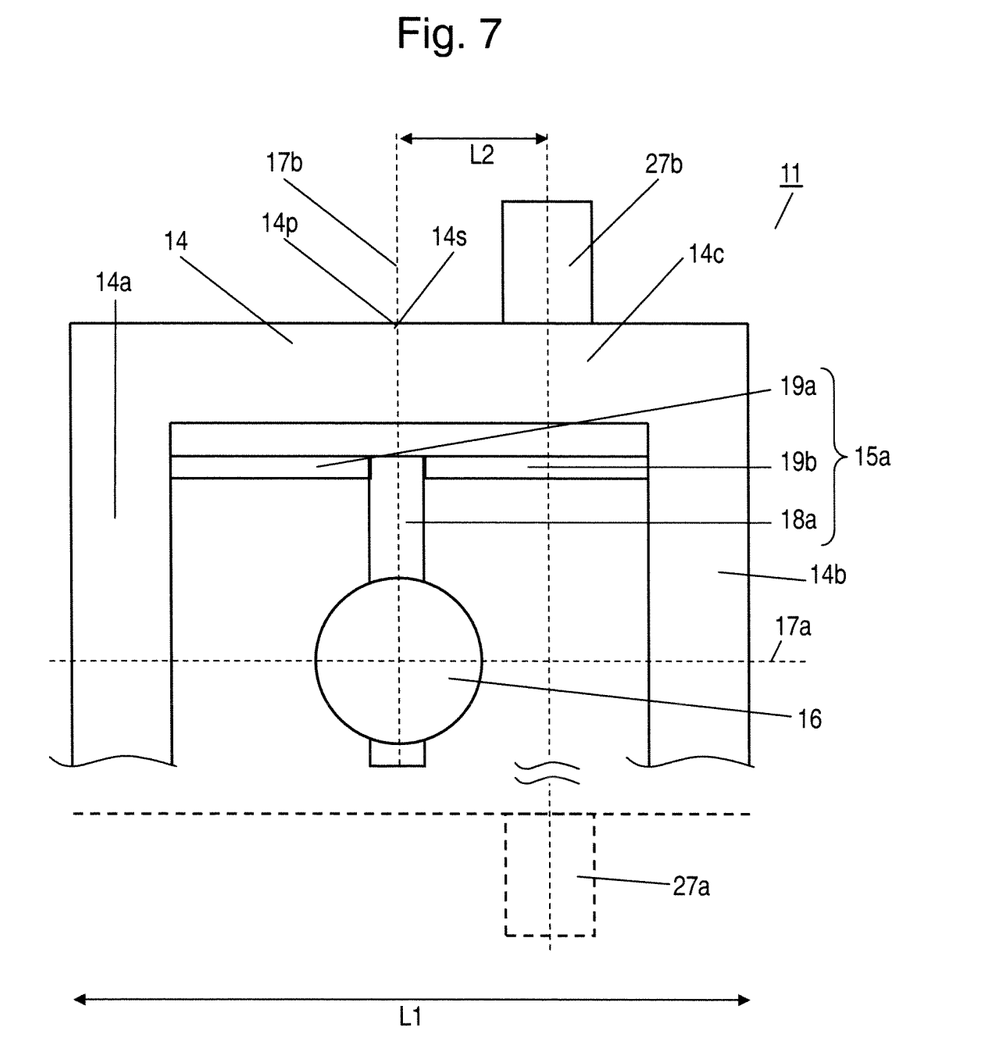
FIG. 7 is an enlarged view of the optical reflection element according to the embodiment.

In optical reflection element 11 according to the embodiment, connection portions 27a and 27b may not necessarily be connected to movable frame 14 exactly on rotation axis 17b. FIG. 7 is an enlarged view of optical reflection element 11 particularly for illustrating movable frame 14 and connection portion 27a. To reduce the unnecessary vibration, connection portions 27a and 27b are connected to part 14p where the displacement of movable frame 14 has a minimum amount. To reduce the unnecessary vibration, however, Formula 1 may be satisfied with the length L1 of sides 14c and 14d of movable frame 14 in the direction of rotation axis 17a and distance L2 between rotation axis 17b and midpoint 14s of connection portions 27a and 27b in the direction of rotation axis 17a.

$$L2 \leq L1/4 \quad \text{(Formula 1)}$$

Upon satisfying Formula 1, connection portions 27a and 27b, i.e., vibration portions 13a and 13b, supports the part where the amount of the displacement of movable frame 14 is small, hence reducing the unnecessary vibration transmitting to vibration portions 13a and 13b. As distance L2 increases more than the value of L1/4, the positions supported by connection portions 27a and 27b are located away from part 14p where the displacement of movable frame 14 has a minimum amount. Consequently, vibration of vibration portions 15a and 15b easily transmits to vibration portions 13a and 13b and causes the unnecessary vibration in vibration portions 13a and 13b.

The position of part 14p where the displacement of movable frame 14 due to rotational vibration of mirror 16 and vibration portions 15a and 15b has a minimum amount changes depending on the position of the center of gravity of each of vibration portions 15a and 15b.

Figure 8:
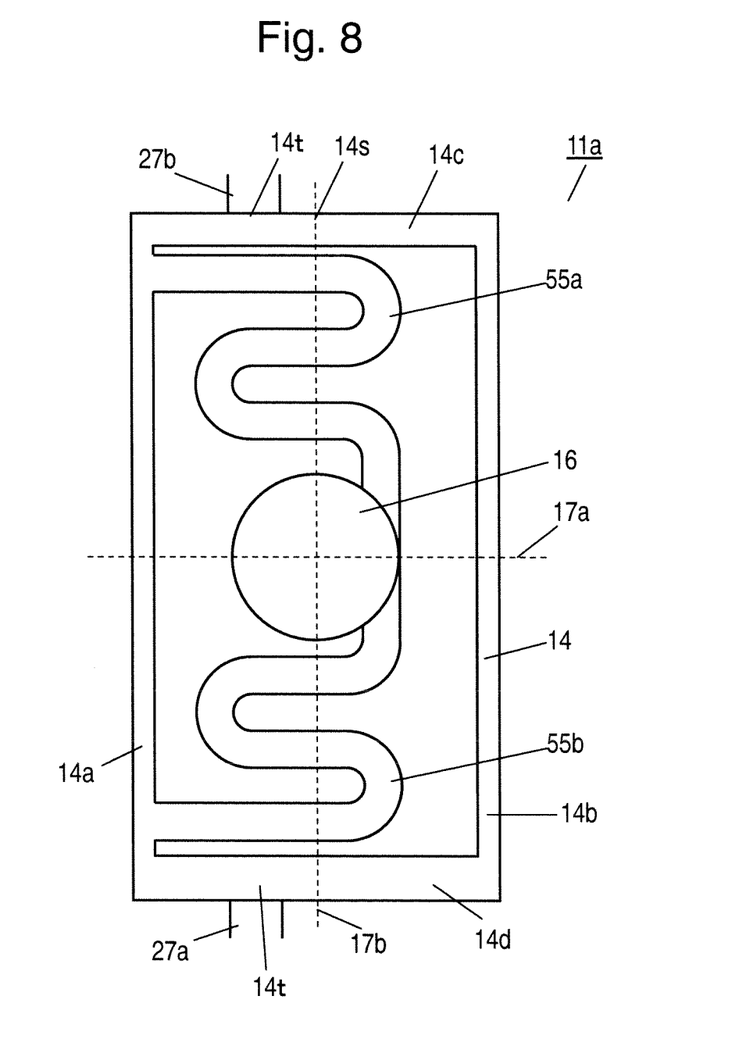
FIG. 8 is an enlarged view of another optical reflection element according to the embodiment.

FIG. 8 is an enlarged top view of another optical reflection element 11a according to the embodiment. In FIG. 8, components identical to those of optical reflection element 11 shown in FIGS. 1 to 7 are denoted by the same reference numerals. Optical reflection element 11a includes vibration portions 55a and 55b that support mirror 16 instead of vibration portions 15a and 15b that support mirror 16 of optical reflection element 11 shown in FIGS. 1 to 7. Both vibration portions 15a and 15b shown in FIG. 4 are connected to sides 14a and 14b of movable frame 14 opposite to each other. Vibration portions 55a and 55b shown in FIG. 8 are connected only to side 14a of movable frame 14, not to any of sides 14b to 14d. In optical reflection element 11a, parts 14p (shown in FIGS. 1-7 of the optical reflection element 11), where the displacement of movable frame 14 due to rotational vibration of vibration portions 55a and 55b has a minimum amount are positioned at parts 14t that are located away from midpoints 14s of sides 14c and 14d toward side 14a. Connection portions 27a and 27b are connected to parts 14t of sides 14d and 14c of movable frame 14 minimizes the amount of the displacement of movable frame 14, hence reducing vibration transmitting from vibration portions 55a and 55b to vibration portions 13a and 13b (shown in FIGS. 1-7 of the optical reflection element 11).

Vibration portions 15a and 15b may have meandering shapes having one ends connected to sides 14c and 14d of movable frame 14 and having another ends connected to mirror 16 instead of the torsion bar shape shown in FIG. 4, similarly to vibration portions 13a and 13b. This configuration increases the amount of the displacement of rotational vibration of vibration portions 15a and 15b about rotation axis 17b, similarly to vibration portions 13a and 13b. This optical reflection element reduces unnecessary vibration transmitting to vibration portions 13a and 13b while providing the large amount of the displacement of rotational vibration of mirror 16 about rotation axis 17b.

Figure 9:
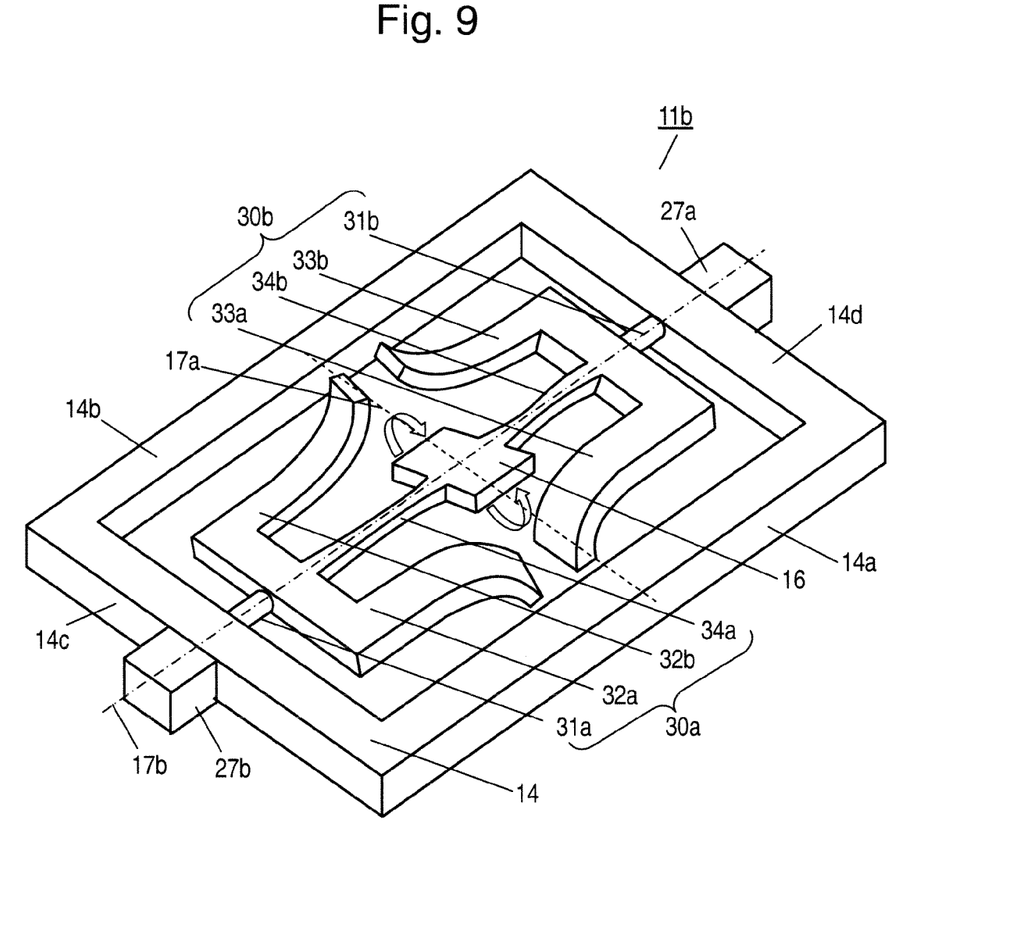
FIG. 9 is an enlarged perspective view of still another optical reflection element according to the embodiment.

FIG. 9 is an enlarged perspective view of further optical reflection element 11b according to the embodiment. In FIG. 9, components identical to those of optical reflection element 11 shown in FIGS. 1 to 7 are denoted by the same reference numerals. Optical reflection element 11b shown in FIG. 9 includes vibration portions 30a and 30b having a tuning fork shape, instead of vibration portions 15a and 15b having a torsion bar shape. Vibration portion 30a includes supporting part 31a having one end connected to side 14c of movable frame 14, arms 32a and 32b connected to another end of supporting part 31a, and torsion bar 34a having one end connected to another end of supporting part 31a. Another end of torsion bar 34a is connected to mirror 16. Supporting part 31a and torsion bar 34a have a beam shape that extends along rotation axis 17b. Supporting part 31a and arms 32a and 32b constitute the tuning fork shape. Vibration portion 30b includes supporting part 31b having one end connected to side 14d of movable frame 14, arms 33a and 33b connected to another end of supporting part 31b, and torsion bar 34b having one end connected to another end of supporting part 31b. Another end of torsion bar 34b is connected to mirror 16. Supporting part 31b and torsion bar 34b have a beam shape that extends along rotation axis 17b. Supporting part 31b and arms 33a and 33b constitute the tuning fork shape.

Similarly to vibration portions 13a, and 15a and 15b shown in FIGS. 2 and 4, each of arms 32a and 32b and arms 33a and 33b includes substrate 20 made of silicon, insulating layer 21 provided on substrate 20, lower electrode 22 provided on insulating layer 21, piezoelectric layer 23 provided on lower electrode 22, and upper electrode 24 provided on piezoelectric layer 23. Substrate 20, insulating layer 21, lower electrode 22, piezoelectric layer 23, and upper electrode 24 are stacked in thickness direction D111.

Upon a predetermined voltage being applied between lower electrode 22 and upper electrode 24, a reverse piezoelectric effect causes piezoelectric layer 23 to expand and contract in surface direction D112 of piezoelectric layer 23, and causes arms 32a and 32b and arms 33a and 33b to vibrate and warp in thickness direction D111. A voltage applied to piezoelectric layer 23 of arm 32a has a phase opposite to that of a voltage applied to piezoelectric layer 23 of arm 32b while a voltage applied to piezoelectric layer 23 of arm 33a has a phase opposite to that of a voltage applied to piezoelectric layer 23 of arm 33b. This operation causes arms 32a and 32b to vibrate and warp in directions opposite to each other, and causes arms 33a and 33b to vibrate and warp in directions opposite to each other. Further, a voltage applied to piezoelectric layer 23 of arm 32a has a phase opposite to that of a voltage applied to piezoelectric layer 23 of arm 33a while a voltage applied to piezoelectric layer 23 of arm 32b has the same phase as a voltage applied to piezoelectric layer 23 of arm 33b. This operation causes arms 32a and 33a to vibrate and warp in the same direction, and arms 32b and 33b to vibrate and warp in the same direction. This vibration causes supporting parts 31a and 31b and torsion bars 34a and 34b to vibrate and twist, and causes mirror 16 to vibrate rotationally about rotation axis 17b.

Connection portions 27a and 27b that connect vibration portions 13a and 13b to movable frame 14 will be detailed below.

Figure 10A:
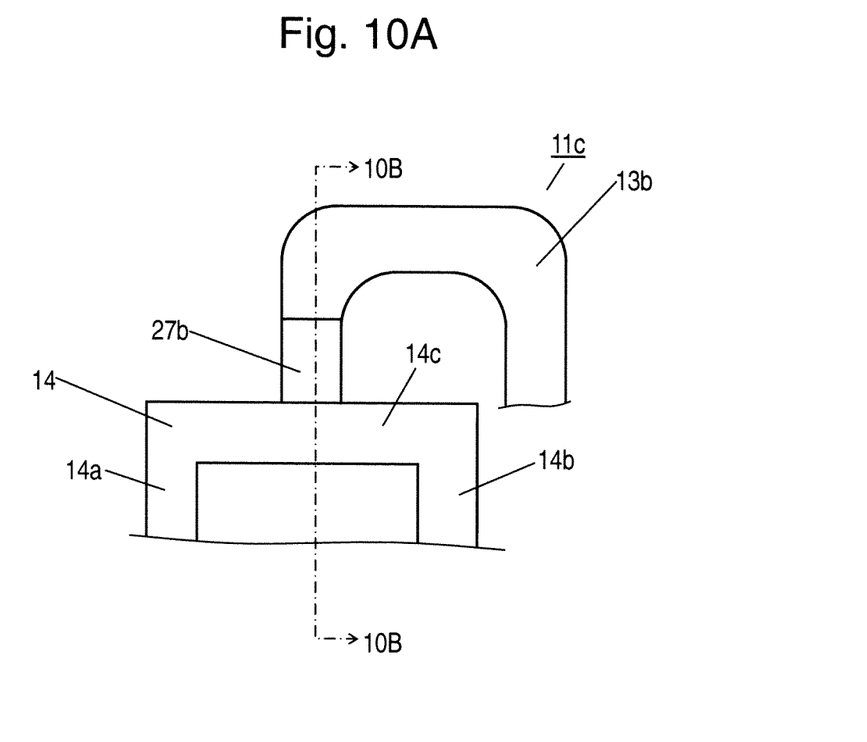
FIG. 10A is an enlarged perspective view of a further optical reflection element according to the embodiment.
Figure 10B:
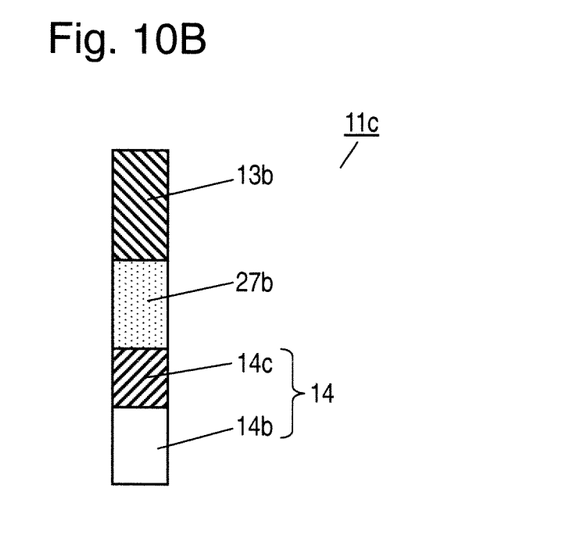
FIG. 10B is a sectional view of the optical reflection element at line 10B-10B shown in FIG. 10A.

FIG. 10A is an enlarged view of further optical reflection element 11c according to the embodiment. FIG. 10B is a sectional view of optical reflection element 11c at line 10B-10B shown in FIG. 10A. In FIGS. 10A and 10B, components identical to those of optical reflection element 11 (11a, 11b) shown in FIGS. 1 to 9 are denoted by the same reference numerals. In optical reflection element 11 (11a, 11b) according to the embodiment, connection portions 27a and 27b includes substrate 20 made of silicon integrally formed with vibration portions 13a and 13b, movable frame 14, and vibration portions 15a and 15b (30a, 30b). This configuration reduces the unnecessary vibration of vibration portions 13a and 13b.

In optical reflection element 11c shown in FIGS. 10A and 10B, connection portions 27a and 27b, unlike substrate 20, are made of a material having rigidity lower than silicon. This material further reduces the unnecessary vibration resulting from the rotational vibration of vibration portions 15a and 15b transmitting to vibration portions 13a and 13b.

As described above, the arrangement in which connection portions 27a and 27b that connect vibration portions 13a and 13b to movable frame 14 are placed on rotation axis 17b, i.e., the rotation center of vibration portions 15a and 15b can reduce vibration energy transmitting to vibration portions 13a and 13b. Twist vibration is generated near positions where sides 14c and 14d of movable frame 14 cross rotation axis 17b. Connection portions 27a and 27b of optical reflection elements 11, 11a and 11b includes substrate 20 made of silicon as well as vibration portions 13a and 13b and movable frame 14. This configuration allows energy caused by this twisting vibration to transmit toward vibration portions 13a and 13b without being attenuated. Connection portions 27a and 27b of optical reflection element 11c shown in FIGS. 10A and 10B may be made of material with smaller rigidity, i.e., a larger attenuation coefficient, than vibration portions 13a and 13b and movable frame 14. This configuration can reduce the vibration energy transmitting from vibration portions 15a and 15b.

A material of connection portions 27a and 27b that has smaller rigidity than silicon and that matches the MEMS technology is a resin material, such as polyimide, epoxide-based permanent resist, parylene, or amorphous fluorine resin.

Figure 11:
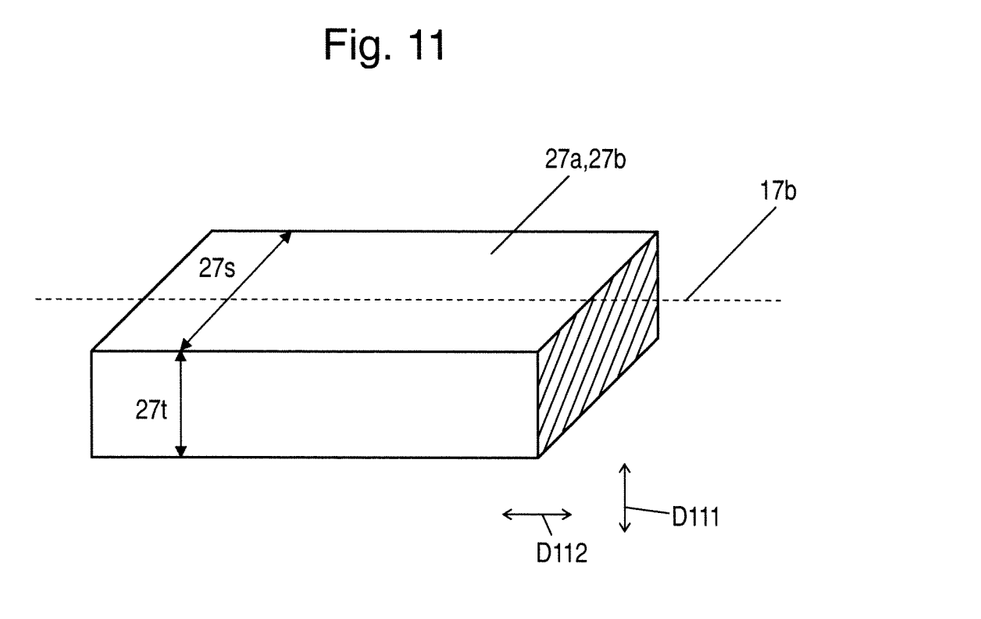
FIG. 11 is an enlarged view of a connection portion of the optical reflection element according to the embodiment.

FIG. 11 is an enlarged view of optical reflection elements 11 and 11a to 11c according to the embodiment for illustrating connection portions 27a and 27b. Width 27s of connection portion 27a (27b) is a width in a direction perpendicular to thickness direction D111 of connection portions 27a and 27b that connect vibration portions 13a and 13b to movable frame 14. In optical reflection elements 11 and 11a to 11c according to the embodiment, width 27s is preferably larger than thickness 27t of connection portion 27a (27b) in thickness direction D111. In other words, regarding a cross section of connection portion 27a (27b) perpendicular to rotation axis 17b, a width of the cross section of connection portion 27a (27b) in a direction perpendicular to thickness direction D111 is preferably larger than a width, i.e., a thickness of the cross section in thickness direction D111. The rotational vibration of mirror 16 produces a reaction that causes movable frame 14 to rotationally vibrate, and causes connection portions 27a and 27b connected to movable frame 14 to vibrate and twist to generate a twisting stress. The twisting stress concentrates at the center of a longer side of the cross section of connection portion 27a (27b) perpendicular to rotation axis 17b, generating a maximum stress. Substrate 20 may be processed in thickness direction D111 by dry etching. The dry etching may produce asperities called scallops in a surface of substrate 20 parallel to thickness direction D111. Hence, if the surface in thickness direction D111 is the longer side of the cross section, a stress easily concentrates at the asperities, and decreases strength against destruction. Thus, a surface in a direction different from thickness direction D111, e.g. a surface perpendicular to thickness direction D111 is located on a longer side of the cross section of connection portions 27a and 27b. This configuration provides a predetermined level of strength against the twisting stress in connection portions 27a and 27b.

INDUSTRIAL APPLICABILITY

A piezoelectric actuator according to the present invention provides an optical reflection element capable of projecting clear images on a screen, hence being applicable to a small projector and a head-mounted display.

REFERENCE MARKS IN THE DRAWINGS

11 Optical Reflection Element
12 Fixed Portion
13a, 13b Vibration Portion (First Vibration Portion)
14 Movable Frame
15a, 15b Vibration Portion (Second Vibration Portion)
16 Mirror
17b Rotation Axis
27a, 27b Connection Portion

The invention claimed is:

1. An optical reflection element comprising:
a fixed portion having a pair of sides opposite to each other;
a pair of first vibration portions having one ends and another ends, respectively, each of the one ends of the pair of first vibration portions being connected to respective one of the pair of sides of the fixed portion;
a pair of connection portions each connected to respective one of the another ends of the pair of first vibration portions;
a movable frame rotatably supported by the another ends of the pair of first vibration portions via the pair of connection portions, the movable frame having a pair of sides opposite to each other, the movable frame rotatable about a first rotation axis;
a pair of second vibration portions having one ends and another ends, respectively, each of the one ends of second vibration portions being connected to respective one of the pair of sides of the movable frame; and
a mirror rotatably connected to the another ends of the pair of second vibration portions, the mirror rotatable about a second rotation axis,
wherein the pair of second vibration portions are configured to transmit a rotational vibration about the second rotation axis to the mirror,
wherein each of the pair of connection portions is connected to respective one of the pair of sides of the movable frame that intersects the second rotation axis, and
wherein the pair of connection portions are connected to a part of the movable frame at which a displacement of the movable frame due to the rotational vibration of the mirror has a minimum amount,
wherein a direction of the first rotation axis is different from a direction of the second rotation axis.

2. The optical reflection element according to claim 1,
wherein each of the pair of connection portions is connected to respective one of the pair of sides of the movable frame, and
wherein a distance from each of centers of widths of the pair of connection portions to the second rotation axis is not larger than ¼ a length of each of the pair of sides of the movable frame, the widths and the length being defined in a direction perpendicular to the second rotation axis.

3. The optical reflection element according to claim 2, wherein the pair of connection portions are connected to the movable frame on the second rotation axis.

4. The optical reflection element according to claim 1, wherein widths of the pair of connection portion is larger than thicknesses of the pair of connection portions, the widths defined in a direction perpendicular to the second rotation axis, the thickness being defined in a direction perpendicular to the first rotation axis and the second rotation axis.

5. The optical reflection element according to claim 1, wherein the pair of first vibration portions are symmetrical to each other with respect to a center of the mirror.

6. The optical reflection element according to claim 1, wherein the pair of connection portions have smaller rigidity than the pair of first vibration portions.

7. The optical reflection element according to claim 1, wherein the pair of first vibration portions have meandering shapes.

8. The optical reflection element according to claim 1, wherein the mirror is surrounded by the movable frame.

9. The optical reflection element according to claim 1, wherein the mirror is rotatable about the second rotation axis with respect to the movable frame.

* * * * *